United States Patent [19]

Fenimore et al.

[11] 4,360,797

[45] * Nov. 23, 1982

[54] CODED APERTURE IMAGING WITH UNIFORMLY REDUNDANT ARRAYS

[75] Inventors: Edward E. Fenimore; Thomas M. Cannon, both of Los Alamos, N. Mex.

[73] Assignee: The United States of America as represented by the United States Department of Energy, Washington, D.C.

[*] Notice: The portion of the term of this patent subsequent to Jun. 24, 1997, has been disclaimed.

[21] Appl. No.: 83,909

[22] Filed: Oct. 11, 1979

Related U.S. Application Data

[62] Division of Ser. No. 902,183, May 2, 1978, Pat. No. 4,209,780.

[51] Int. Cl.$^3$ .................................................. G01T 1/00
[52] U.S. Cl. ..................... 340/146.3 F; 250/363 S; 250/505.1; 340/146.3 Q; 350/162 ZP
[58] Field of Search .............. 364/514, 604, 728, 819, 364/820, 822; 350/162 SF, 162 ZP, 162 R, 169, 168, 266, 319; 340/146.3 G, 146.3 MA, 146.3 F, 146.3 Q, 146.3 P; 250/272, 273, 320, 321, 323, 363 R, 363 S, 445 R

[56] References Cited

U.S. PATENT DOCUMENTS

| | | | |
|---|---|---|---|
| 3,248,552 | 4/1966 | Bryan | 340/146.3 G |
| 3,700,895 | 10/1972 | Dicke | 250/323 |
| 3,748,470 | 7/1973 | Barrett | 250/320 |
| 3,791,275 | 2/1974 | Bryngdahl | 350/162 ZP |
| 3,829,688 | 8/1974 | Barrett | 250/320 |
| 3,860,821 | 1/1975 | Barrett | 250/363 S |
| 3,969,699 | 7/1976 | McGlaughlin | 340/146.3 F |
| 4,165,462 | 8/1979 | Macovski et al. | 250/445 T |
| 4,209,780 | 6/1980 | Fenimore et al. | 340/146.3 F |

Primary Examiner—Leo H. Boudreau
Attorney, Agent, or Firm—William W. Cochran, II; Richard G. Besha

[57] ABSTRACT

A system utilizing uniformly redundant arrays to image non-focusable radiation. The uniformly redundant array is used in conjunction with a balanced correlation technique to provide a system with no artifacts such that virtually limitless signal-to-noise ratio is obtained with high transmission characteristics. Additionally, the array is mosaicked to reduce required detector size over conventional array detectors.

2 Claims, 9 Drawing Figures

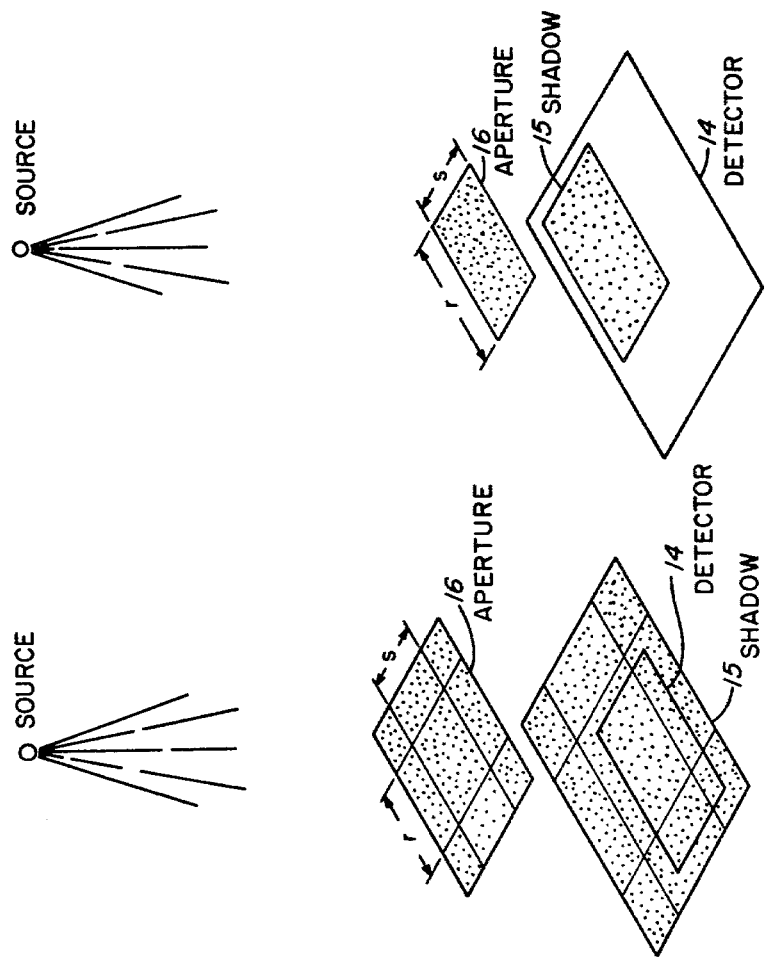

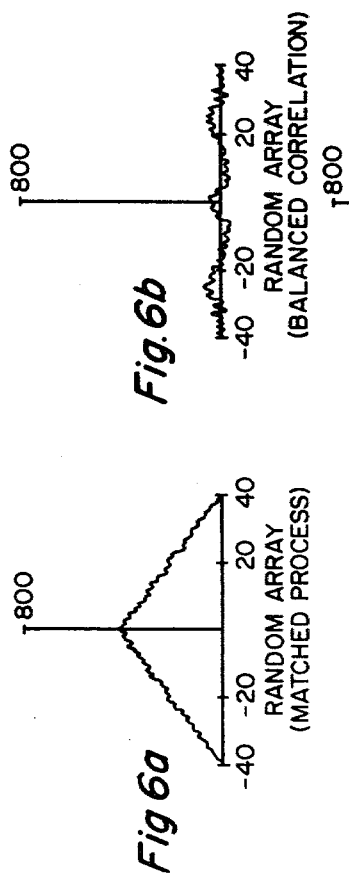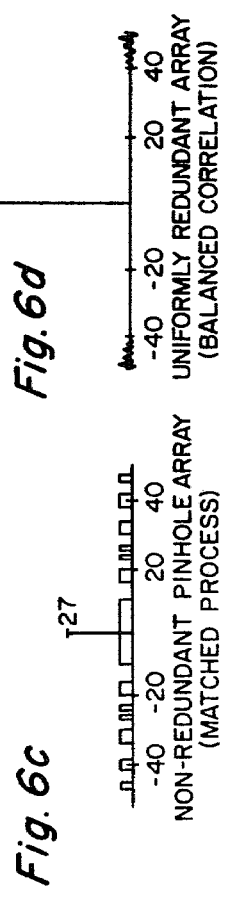

CODED APERTURE IMAGING WITH UNIFORMLY REDUNDANT ARRAYS

This is a division, of application Ser. No. 902,183, filed May 2, 1978, now U.S. Pat. No. 4,209,780.

BACKGROUND OF THE INVENTION

The present invention pertains generally to imaging devices and more specifically to coded aperture imaging of nonfocusable radiation.

The concept of using a coded aperture to image nonfocusable radiation was first introduced by L. Mertz and N. Young, Proc. Conf. Optical Instruments and Techniques, London 1961, p. 305 and later implemented with random arrays and by R. H. Dicke, Astrophys. J. 153, L 101 (1968) and J. G. Ables, Proc. Astron. Soc. Aust. 4, 172 (1968). In the formulation by Dicke and Ables, the opening of a single pinhole camera was replaced by many randomly arranged pinholes which are collectively known as the aperture. As shown in FIG. 1, each point of a self-luminous object projects a shadow of the aperture on the recorded image plane (picture). Subsequent correlation processing of the picture yields the reconstructed image which resembles the original self-luminous objects.

There are two primary motivations for using a coded aperture approach as shown in FIG. 1. The original motivation was to obtain an imaging system which maintained the high angular resolution of a small single pinhole but produced images that have a signal-to-noise ratio commensurate with the total open area of the aperture. Since coded aperture imaging is often applied to nonfocusable radiation sources which are weak, a single pinhole camera would require a very large opening in order to obtain a reasonable signal-to-noise ratio. However, such a large hole would preclude desired angular resolution.

By using a plurality (N) of pinholes in the aperture, high transmission characteristics can be obtained on a picture which consists of N overlapping images of the object. For a point source, the coded aperture technique can improve the signal-to-noise ratio by approximately $\sqrt{N}$ when compared to the single pinhole camera. Since N can be as large as $10^5$, the goal of an improved signal-to-noise ratio is obtainable.

The second primary motivation for using coded apertures is to perform tomography as disclosed by H. H. Barrett et al., Appl. Opt. 12, 2686 (1973). As disclosed, object points at different distances from the aperture cast shadows of the aperture onto the picture with different over-all sizes. The particular depth of a point in the object can be reconstructed by treating the picture as if it were formed by an aperture scaled to the size of the shadow produced by the depth of the point. This property of coded apertures is particularly beneficial in medical applications, although uses in industrial inspection are apparent. Other obvious uses of the coded aperture imaging technique for both two-dimensional and three-dimensional imaging include imaging of cosmic sources, analyzing the configuration of concealed nuclear material, viewing laser fusion events, e-beam fusion events, medical applications, e.g., viewing injected radioisotopes, etc., viewing reactor cores, or imaging any other source of nonfocusable radiation.

The recorded image, or picture, is usually not recognizable as the object since the many pinholes cause the picture to consist of many overlapping images. In order to be useful, the picture must be subjected to a reconstruction operation which compensates for the effects of the imaging system. The reconstruction procedure is designed to give the location and intensity of each source in the field of view. Basically, this is accomplished by detecting the location and strength of the aperture pattern in the picture. The analysis methods which have been developed can be categorized as either deconvolution methods or correlation methods. Each of these methods has been heuristically developed in the manner disclosed below.

If the recorded picture of FIG. 1 is represented by a function P, the aperture A and the object O, $$P = (O*A) + N \tag{1}$$

where * is the correlation operation and N is some noise function. In the deconvolution methods, the object is obtained as follows:

$$\hat{O} = RF^{-1}[F(P)/F(A)] = O + RF^{-1}[F(N)/F(A)], \tag{2}$$

where F, $F^{-1}$, and R are, respectively, the Fourier transform, the inverse Fourier transform, and the reflection operator.

A major disadvantage of the deconvolution method is that F(A) often times contains small terms which can cause the noise to dominate the reconstructed object. In fact, it has empirically been determined that roughly 15% of the Fourier transforms of a $32 \times 32$ random array have at least one term which is zero. Although it is possible to avoid these particular arrays, it appears that it is a general property of large binary random arrays to have some small terms in their Fourier transform. Although the noise has been reduced by using Wiener filtering, disclosed by J. W. Woods et al., IEEE Trans. Nucl. Sci. NS-22, 379 (1975), the major problem of the deconvolution method is that there remains a possibility of small terms in the F(A) resulting in an unacceptably noisy reconstruction.

In the correlation method, the reconstructed object is defined to be $$\hat{O} = P*G = RO*(A*G) + N*G \tag{3}$$

where G is called the postprocessing array and is chosen such that A*G approximates a delt function. Normally G is a binary array and is selected such that A*G has desirable properties, rather than being the convolutional inverse function ($A^{-1}$). If A*G is a delta function $\hat{O} = O + N*G$, and the object can be perfectly reconstructed except for the presence of the noise term. Note that the noise term in the above equation does not have singularities as in the deconvolution method, which is an advantage of the correlation method over the deconvolution method.

The expectation of obtaining a roughly $\sqrt{N}$ improvement in the signal-to-noise ratio has not, however, been realized since A*G in general is not a delta function. When this is true, a point on the object will contribute A*G to the reconstructed object instead of a delta function. Thus, even when no background noise is present, the signal-to-noise ratio for a point source becomes a fixed number which is the ratio of the central peak in A*G to the noise in A*G, i.e., the square root of the variance of the sidelobes which is referred to as artifacts. These artifacts, in this manner, limit the possible signal-to-noise ratio improvement.

The obtainable signal-to-noise ratio is even further decreased when the point source is changed to an extended source. For an extended source, the artifacts from all points in the object contribute noise to each point in the reconstructed object. The result is a low signal-to-noise ratio which cannot be improved since the noise is set by the structure in $A^*G$ rather than by counting statistics or background levels. In fact, the obtainable signal-to-noise ratio for the coded aperture technique can often times be smaller than the obtainable signal-to-noise ratio for a comparative single pinhole camera for extended sources.

Nonredundant arrays have the property that their autocorrelations, i.e., $A^*A$, consist of a central spike with the sidelobes equal to unity to some particular lag L, and either zero or unity beyond that point, as disclosed by M. J. E. Golay, J. Opt. Soc. Am. 61, 272 (1970). Although this autocorrelation technique used with nonredundant arrays approaches a true delta function, a true delta function has all sidelobes to infinite lags equal to zero. The fact that the sidelobes are equal to a constant value such as unity, affects the reconstructed object by the addition of a removable dc level. By removing the dc level, a true delta function is obtained. However, the sidelobes of the nonredundant array do not have a constant value and hence the reconstructed object necessarily contains artifacts.

The property of the nonredundant array which allows the sidelobes to be flat is apparent by measuring the separation between possible pairs of holes. Each separation (to L) occurs only once, rendering the separations nonredundant. This property, however, limits the number of holes which can be placed in the array. For example, a large nonredundant array having 24 holes has an open area density of only 0.03. This lack of holes in the aperture does not function to significantly increase the transmission characteristics of the aperture over a single pinhole.

SUMMARY OF THE INVENTION

The present invention overcomes the disadvantages and limitations of the prior art by providing a device for coded aperture imaging utilizing uniformly redundant arrays. The uniform redundant array combines the high-transmission characteristics of the random array with the flat sidelobe advantage of the nonredundant arrays. The high-transmission capability of the uniformly redundant array allows imaging of very low intensity sources, and the flat sidelobes eliminates artifacts which have heretofore obscured low contrast sources. A balanced correlation method is used with the uniformly redundant array to eliminate the high contrast artifacts resulting from the nonzero sidelobe of the autocorrelation function.

It is therefore an object of the present invention to provide a device for improved coded aperture imaging.

It is also an object of the present invention to provide coded aperture imaging with uniformly redundant arrays.

Another object of the present invention is to provide coded aperture imaging with uniformly redundant arrays having high transmission capability to image low intensity sources.

Another object of the present invention is to provide coded aperture imaging with uniformly redundant arrays to eliminate artifacts.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from this detailed description. The foregoing Abstract of the Disclosure is for the purpose of providing a non-legal brief statement to serve as a searching and scanning tool for scientists, engineers and researchers and is not intended to limit the scope of the invention as disclosed herein, nor is it intended to be used in interpreting or in any way limiting the scope or fair meaning of the appended claims.

BRIEF DESCRIPTION OF THE DRAWINGS

FIG. 3 schematically illustrates a first geometry for coded aperture imaging using mosaicked arrays.

FIG. 4 schematically illustrates a second geometry for imaging coded aperture arrays.

FIG. 6a illustrates the system point spread function for a single source for an autocorrelated 40×40 random array aperture.

FIG. 6b illustrates the system point spread function utilizing balanced correlation for a single source imaged through a 40×40 random array.

FIG. 6c illustrates the system point spread function utilizing the autocorrelation process for a single source imaged through a nonredundant pinhole array.

FIG. 6d illustrates the system point spread function utilizing the balanced correlation process for a single source imaged through a uniformly redundant array.

DETAILED DESCRIPTION OF THE PREFERRED EMBODIMENT OF THE INVENTION

Figure 1:
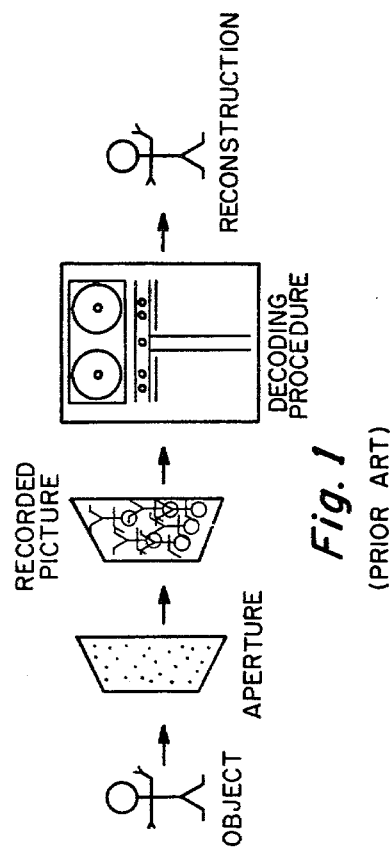
FIG. 1 is a prior art schematic illustration of the basic procedure for coded aperture imaging.
Figure 2:
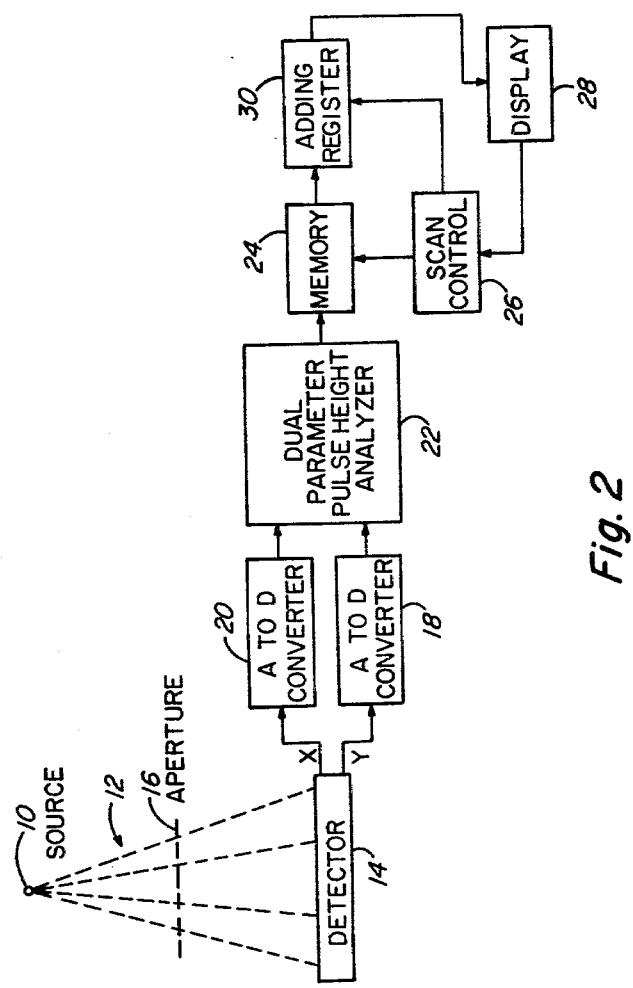
FIG. 2 is a block diagram of the apparatus used for coded aperture imaging in accordance with the preferred embodiment of the invention.
Figure 5:
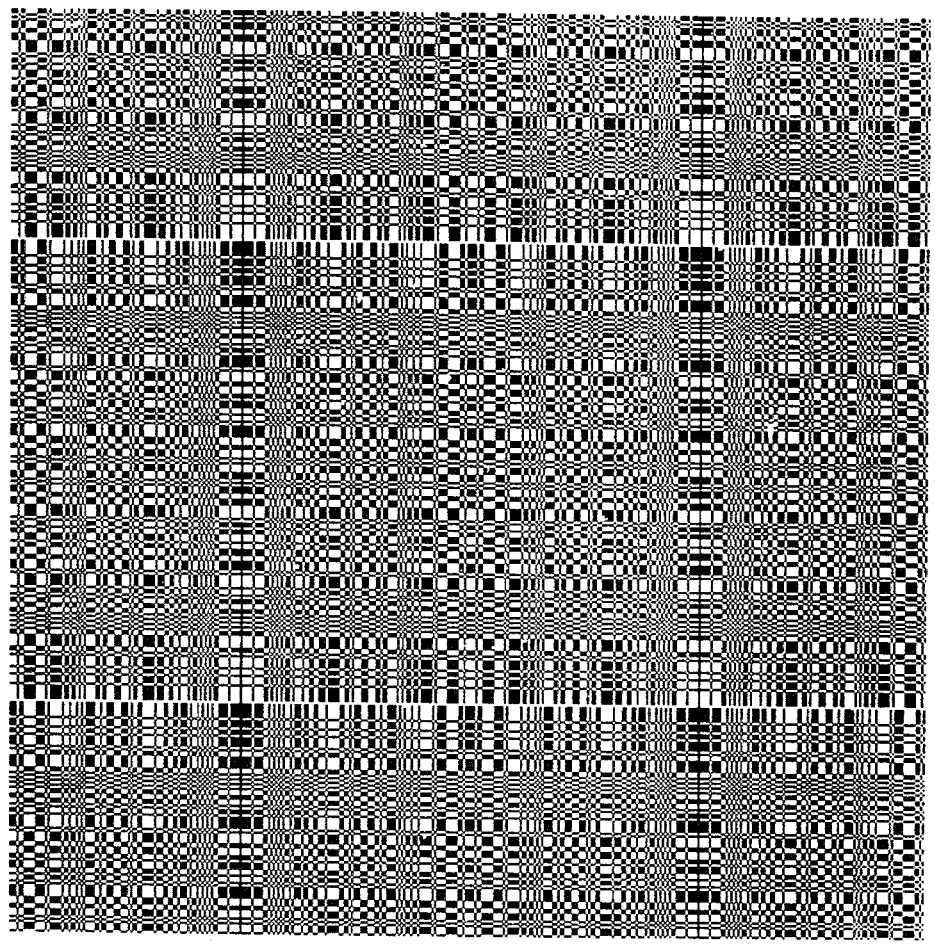
FIG. 5 is an example of a uniformly redundant array.

FIG. 2 illustrates the device of the preferred embodiment of the invention. A source 10 of nonfocusable radiation emits quanta 12 which impinge upon detector 14 when their path intersects the URA aperture 16 at a hole. The aperture consists of opaque and nonopaque (i.e. holes) regions arranged in a uniformly redundant array pattern. The aperture 16 is a section of a uniformly redundant array consisting of a mosaic of identical basic arrays.

The arrangement of holes (i.e., x,y position) for a uniformly redundant array is determined in several ways.

In general, a uniformly redundant array is defined as any function $A(I,J)$ which has the following properties:

$A(I,J)$ is periodic, that is $$A(I,J) = A(I+r, J+s)$$

(where r and s are constants not equal to zero) and A has a flat autocorrelation, that is $$\sum_{I=0}^{r-1} \sum_{J=0}^{s-1} A(I,J) \cdot A(I+K, J+L)$$

$$= C_1 \text{ if } \text{mod}_r K = 0, \text{mod}_s L = 0$$

and

-continued $$= C_2 \text{ otherwise}$$

where $C_1 \neq C_2$ and $C_1 \neq 0$ where $C_1$ and $C_2$ are constants
One example of an array of numbers is:

$$A(I,J) = 0 \text{ if } I = 0 \quad\quad (4)$$
$$A(I,J) = 1 \text{ if } J = 0, I/0,$$
$$A(I,J) = 1 \text{ if } C_r(I)C_s(J) = 1,$$
$$A(I,J) = 0 \text{ otherwise,}$$

where $C_r(I) = 1$ if there exists an integer x, $1 \geq x < r$
$C_r(I) = $ such that $I = \mod_r x^2$
$-1$ otherwise
$C_s(J) = 1$ if there exists an integer x, $1 \geq x \geq s$ such that $I = \mod_s x^2$
$C_s(J) = -1$ otherwise
and r and s are two prime numbers such that $r - s = 2$. Therefore, a hole is placed at i,j whenever $A[\mod_r i, \mod_s j] = 1$ Other formulations are also possible (for example, MacWilliam and Sloane, Proc. of IEEE 64, 1715 (1975).

The apertures are fabricated by employing eq. (4) to generate a set of equations for the location of the holes.

Each hole in the aperture has a size approximately equal to the resolution ability of the detector (c) and placed at the position $x = i \cdot c$ and $y = J \cdot c$.

Typically the hole locations are generated by a general purpose computer and stored on a magnetic tape in a format that can be read by a computer-driven plotter (e.g., Gerber flat-bed precision plotter). Typically the aperture is plotted at 20 times full scale on the Gerber Plotter in order to obtain an accurate image of the aperture. The plot is then photo-reduced to final size. A replica of the image is then electroformed into a material such as nickel. Electroforming is a standard manufacturing process in which the plot pattern is used to form a similar pattern using a photo-resist on a desired substrate. The substrate is placed in a solution and an electrical current is used to draw the nickel material to the pattern. When this process is finished, the nickel replica of the pattern is floated off the substrate. This process is generally known to the industry and has been performed at the Los Alamos Scientific Laboratory.

The detector 14, e.g., an Anger camera, detects the quanta and produces an x and y position for the detected location of the quanta. The x and y signal is coverted to a digital position by A to D converters 18 and 20. The digital signal is then applied to a dual parameter pulse height analyzer 22 which increments the appropriate memory location in memory 24. In this manner, the image projected on the detector is stored for subsequent processing.

Once all of the quanta have been recorded in memory 24 scan control 26 is activated. The scan control 26 processes data stored in memory 24 to reconstruct an image of the emitting source on display 28. This is accomplished by adding together all memory elements (I,J) from memory 24 in adding register 30 for which $A[\mod_r(I+K), \mod_s(J+L)]$ is one, to produce each picture element (K,L) in display 28. This autocorrelation method produces reconstructed images which contain non artifacts. The DC term produced by autocorrelation is eliminated by balanced correlation, wherein, scan control 26 adds together all memory elements (I,J) for which $A[\mod_r(I+K) \mod_s(J+L)]$ is one and otherwise substracts $[p/(1-p)]$ times the memory element where p is the fraction of nonopaque area to opaque area in the aperture. In other words, if G(I,J) represents a function for balance correlating information, then:

$$G(I,J) = 1 \text{ if } A(I,J) = 1$$

$$G(I,J) = -p/(1-p) \text{ if } A(I,J) = 0$$

resulting in:

$$\Sigma\Sigma A(I,J)G(I+K,J+L) \propto (rs-1)/2 \text{ if } \mod_r J = 0 \text{ and } \mod_s L = 0$$
$$\Sigma\Sigma A(I,J)G(I+K,J+L) = 0 \text{ otherwise.}$$

An appropriately progammed general purpose computer could, of course, perform the same function as the scan control and adding register. In that case, and particularly for uniformly redundant arrays generated by large prime numbers, the image is reconstructed by calculating the discrete Fourier transform of the picture stored in the memory 24 and the aperture function defined in equation (4). The reconstructed object to be displayed is therefore $$\text{IDFT}[\text{DFT}(P) \cdot \text{DFT}(A)]$$

where IDFT is the inverse discrete Fourier transform and DFT is the discrete Fourier transform.

FIGS. 3 and 4 illustrate the implementation of the URA apertures. In the arrangement of FIG. 4, the aperture consists of a basic r by s aperture pattern. As shown, the detector must be made large enough to contain the image from the full field view. This arrangement is typically used in aperture imaging using random arrays and other coded apertures wherein, the number of required detector elements is roughly equal to the number of aperture elements plus the number of object resolution elements. When imaging various sources of nonfocusable radiation, fabricating detectors with a large number of resolution elements becomes extremely difficult and expensive.

In contrast, FIG. 3 illustrates an arrangement wherein the detector need not be physically larger than the aperture size itself, i.e., $r \cdot c \times s \cdot c$ area where c is the detector picture element size. Even though the source projects photons in a larger region of the detector plane than the above-described detector size, all of the required information is contained in a single section the size of the basic aperture pattern. More specifically, the single section contains a circular correlation of the object with a basic aperture pattern.

The aperture of FIG. 3 consists of a mosaic of basic aperture patterns, each $r \cdot c \times s \cdot c$ in physical size. Memory 24 of FIG. 2 contains information of an $r \times s$ array obtained by observing the $r \cdot c \times s \cdot c$ area directly below the basic aperture pattern. As shown in FIG. 3, only a section of the shadow is detected by the detector 14. This section consists of elements from the central basic pattern as well as elements from neighboring patterns and is a cyclic version of the basic pattern. As long as all object points contribute a complete cyclic version of the basic pattern, the $r \cdot c \times s \cdot c$ section of the picture contains all the information necessary to image the object with no artifacts.

The present invention therefore provides a device for imaging nonfocusable radiation which has a high signalto-noise ratio and high transmission characteristics to image low intensity sources. This is accomplished by using a uniformly redundant array to eliminate artifacts which would otherwise obscure low contrast sources. Additionally, mosaics of a basic uniformly redundant array pattern create a circular correlation of the object on a section of the picture plane. This reduces the area required for information needed to reconstruct the object thereby reducing necessary detector size.

Obviously many modifications and variations of the present invention are possible in light of the above teaching. It is therefore to be understood that within the scope of the appended claims, the invention may be practiced otherwise than is specifically described.

What we claim is:

1. A device for imaging a source of radiation comprising:
  a uniformly redundant array aligned to aperture image said source of radiation;
  means for detecting said radiation imaged by said uniformly redundant array;
  means for balance correlating information from said means for detecting to generate a decoded image of said source of radiation.

2. A device for imaging a source of radiation comprising:
  a uniformly redundant array aperture aligned to project an encoded image of said source of radiation;
  means for detecting said encoded image;
  means for balance correlating said encoded image to generate a decoded image of said source.

* * * * *